United States Patent [19]

Ishikawa et al.

[11] Patent Number: 4,947,916
[45] Date of Patent: Aug. 14, 1990

[54] PNEUMATIC RADIAL TIRE HAVING BELT REINFORCEMENTS

[75] Inventors: Yasuhiro Ishikawa, Hiratsuka; Hiroyuki Kaidoo, Yokohama; Sadakazu Takei; Shuji Takahashi, both of Hiratsuka, all of Japan

[73] Assignee: The Yokohama Rubber Co., Ltd., Tokyo, Japan

[21] Appl. No.: 289,129

[22] Filed: Dec. 23, 1988

[30] Foreign Application Priority Data

Dec. 24, 1987 [JP] Japan .................. 62-325559

[51] Int. Cl.$^5$ .............................................. B60C 9/26
[52] U.S. Cl. ..................................... 152/536; 152/537
[58] Field of Search ................ 152/537, 536, 526, 529

[56] References Cited

U.S. PATENT DOCUMENTS 4,602,666 7/1986 Kabe et al. ...................... 152/536 X

OTHER PUBLICATIONS

Tate, P. E. R., Rubber World, "Maximize Steel Cord Adhesion Using A System of Cobalt and Resorcinol/Formaldehyde Resin", Apr. 1985, pp. 37, 38, 40, 41, 43, 44.

Primary Examiner—Raymond Hoch
Attorney, Agent, or Firm—Finnegan, Henderson, Farabow, Garrett & Dunner

[57] ABSTRACT

Pneumatic radial tires are disclosed which are comprised of two or more belt plies reinforced respectively with an aramid fiber cord and a steel wire cord. Both cords are coated with one and the same rubber composition made up of a selected class of starting rubbers, sulfer, resorcinol and/or its precondensate, hexamethoxymethylmelamine and a selected class of cobalt compounds derived from organic acids. The belt plies excel in water-resistant adhesion and heat resistance and thus have freedom from ply separation, contributing to a radial tire of improved durability.

4 Claims, 1 Drawing Sheet

PNEUMATIC RADIAL TIRE HAVING BELT REINFORCEMENTS

BACKGROUND OF THE INVENTION

1. Field of the Invention

This invention relates to pneumatic radial tires and more particularly to such tires having belt plies reinforced with selected fibrous and metallic materials.

2. Description of the Prior Art

Aromatic polyamide fibers, typified by "Kevlar" fibers of E. I. DuPont Nemours & Co., Inc., are known to be by far mechanically strong and highly elastic than fiber-reinforced tire cords in common use. Such polyamide fibers hereunder referred to as "aramid fibers" have enjoyed a commercial credit as lending themselves to high-quality automobile tires. Many approaches have been proposed with the aramid fibers in the art.

The aramid fibers, however, are difficult to fully exhibit their superior physical characteristics as tire reinforcements because they are not sufficiently adhesive to rubber compared to commonly used fibrous tire cords. Due to their insufficient water-resistant adhesion, the aramid fibers when employed for a tire belt tend to invite objectionable ply separation upon moisturing. While a fiber-reinforced belt is preferred to be disposed adjacent to a tread portion, such aramid fibers have much to be desired to meet the tire reinforcing requirements.

In general, an aramid fiber cord is used in combination with a different cord formed for example of steel wires so as to attain improved reinforcement. Two coat rubbers of different compositions have been used to assemble both cords. One of the coat rubbers has adhesiveness to the aramid fibers and the other to the metallic wires. However, such prior mode of coating leaves the problem that the coat to coat difference in modulus and other physical qualities takes place, resulting in separated ply. This also gives rise to a decline in belt processability and often times tire quality.

SUMMARY OF THE INVENTION

It has now been found that radial tires of enhanced durability can be obtained by the use of at least two belt plies formed respectively of an aramid fiber cord and a steel wire cord and coated respectively with a rubber composition of high adhesion to such fibers and wires.

The present invention, therefore, seeks to provide a new pneumatic radial tire which has a plurality of belt plies reinforced to exhibit improved resistance to water and to heat and which excels in durability without involving ply separation.

Other objects and advantages of the invention will be better understood from the following description taken in connection with the accompanying drawings.

According to the invention, there is provided a pneumatic radial tire comprising: (a) a tire body; and (b) at least two, upper and lower, belt plies built in contiguous relation in the tire body, one of the upper and lower plies being formed of an aromatic polyamide fiber cord, and the other being formed of a steel wire cord, each of the fiber and steel cords having a rubber composition coated on both sides, the composition being essentially comprised of:

(1) 100 parts by weight of a starting rubber;
(2) 2–4.5 parts by weight of sulfur;
(3) 0.5–3 parts by weight of resorcinol, a precondensate thereof or a combination thereof;
(4) 1–5 parts by weight of hexamethoxymethylmelamine; and
(5) 0.05–0.5 part by weight of a cobalt compound derived from an organic acid.

DETAILED DESCRIPTION OF THE INVENTION

Figure 1:
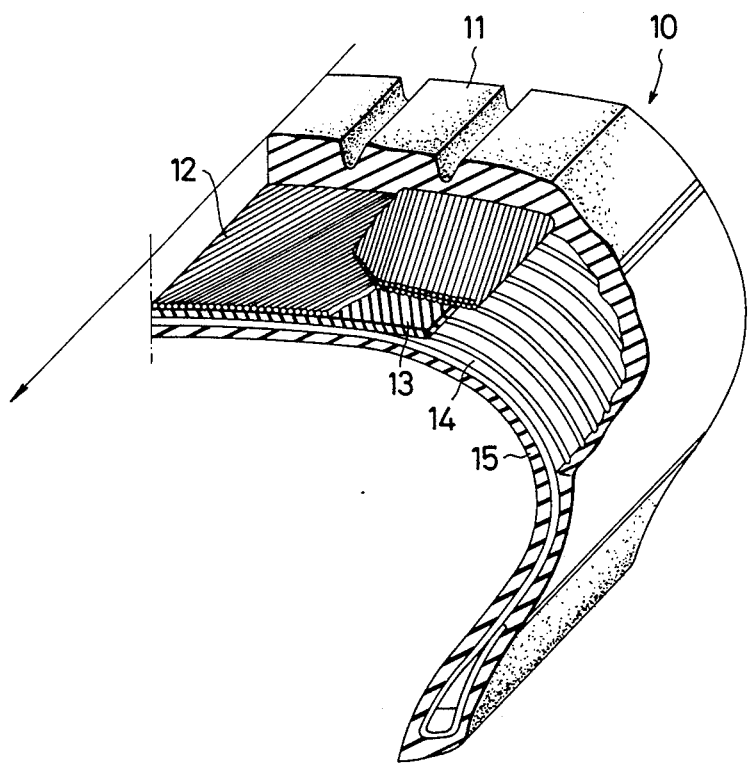
FIG. 1 is a partly broken, segmental perspective view, partly seen cross-sectionally and circumferentially as indicated by the arrow, of the radial tire embodying the present invention.

A radial tire constructed in accordance with the present invention, as shown at 10 in FIG. 1, is comprised of a tire body including a tread 11, a carcass 14 located in the body and a liner 15 disposed peripherally over the carcass 14. A first belt ply 12 is formed of an aramid fiber cord and arranged adjacent to the tread 11. Interposed between the belt ply 12 and the carcass 14 is a second belt ply 13 formed of a steel wire cord. Importantly, each of the belt plies 12 and 13 has coated on both sides a rubber composition later described.

While FIG. 1 is taken to illustrate two belt plies, an additional ply or plies may be used.

Figure 2A:
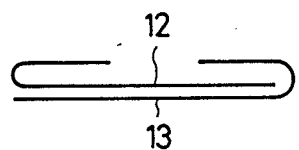
FIGS. 2A to 2C are schematic cross-sectional views showing the manner in which an aramid fiber cord is assembled with a steel wire cord.
Figure 2B:
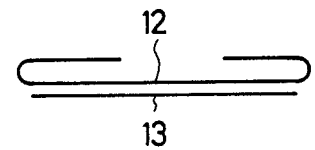
Figure 2C:
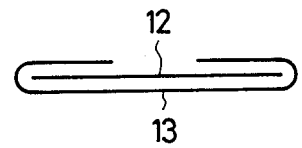

The belt plies 12 and 13 may be assembled in various ways as seen from FIGS. 2A to 2C. In either case, the aramid fiber cord is preferred for the first ply 12 and the steel wire cord for the second ply 13.

The rubber composition used for the purpose of the invention is essentially comprised of:

(1) 100 parts by weight of a starting rubber;
(2) 2–4.5 parts by weight of sulfur;
(3) 0.5–3 parts by weight of resorcinol, its precondensate or their combination;
(4) 1–5 parts by weight of hexamethoxymethylmelamine (HMMM); and
(5) 0.05–0.5 part by weight of a cobalt compound derived from an organic acid.

Component (1) typically includes natural rubber (NR), isoprene rubber (IR), acrylonitrile-butadiene copolymer rubber (NBR), butyl rubber (IIR), styrene-butadiene rubber (SBR), butadiene rubber (BR), styrene-butadiene copolymer rubber (SBR) and their combinations. No particular restriction is imposed on these rubbers, and any rubbers known for tire belts may suitably be used.

The amount of each of components (2) to (5) to be added with component (1) should not depart from the above specified range. Greater amounts of component (2) would result in a rubber mix being physically poor. Component (3) if smaller amounts would not be effective in improving mechanical strength and if larger amounts would mar destruction resistance. Component (4) has an important role to impart sufficient adhesion to tire reinforcements such as steel cords, but excess HMMM would render the finished rubber mix physically deteriorative.

Specific examples of component (5) include cobalt naphthenate, cobalt octylate and complexes of boron and organic acid-derived cobalt compounds such as for example one tradenamed "Manobond 680C" manufactured by Manchem Co., Ltd. Smaller amounts would invite inadequate adhesiveness, whereas greater amounts would lead to fast deterioration and insufficient adhesion.

The rubber composition according to the invention may be incorporated with various other additives such as carbon black, vulcanization accelerators, antioxidants and the like. Carbon black of an HAF type is preferred.

The sequence of admixing components (2) to (5) with component (1) is not particularly limited. Blending may be effected in known manner.

EXAMPLES

The following examples are given to further illustrate the present invention, but should not be construed as limiting the invention.

Inventive Example 1, Standard Examples 1-2 and Comparative Examples 1-4

Four different rubber mixes were prepared as shown in Table 1, followed by coating on aramid fiber cords and steel wire cords as given in Table 2, after which seven tires of a 205/50 VR15 size were provided.

Indoor running test was carried out as regards each of the tires as produced, after aging at 80° C. for 2 weeks and after disposition at 96% RH and at 70° C. for 4 weeks with the results shown in terms of indices in Table 2. Performance evaluation was made by the running distance required for tire destruction took place with a speedup of 8 km/hr at an interval of 30 minutes starting from 121 km/hr on FMVSS's No. 109 high-performance extension tester.

Inventive Example 2 and Comparative Example 5

The rubber mixes of Inventive Example 2 (Composition D) and Comparative Example 5 (Composition A) were coated respectively onto bias-plied Kevlar cords of 1500 D/2, followed by vulcanization at 160° C. for 15 minutes. On dipping in water at room temperature for one day and for 3 days, the resulting samples were examined by peel test for water-resistant adhesion. In addition, the same mixes were coated onto parallel-plied Kevlar cords of 1500 D/2, and measurement was made of peel strength at 100° C., i.e. heat stability. The results of both tests were given in Table 3.

As is apparent from Tables 2 and 3, the rubber compositions according to the invention are highly satisfactory in respect of all the physical characteristics tested. This is attributable to the fiber and steel cords being coatable with one and the same composition, physically identical between the belt plies and free from ply separation, whereby modulus and other important physical properties are uniformly attainable. The inventive composition is sufficiently adhesive to aramid fibers and to steel wires and highly resistant to water and to heat and hence immune from ply separation upon moistening.

Although the invention has been shown and described with reference to certain preferred embodiments, it will be noted that many changes and modifications may be made within the scope of the appended claims.

TABLE 1

| Formulations | Rubber Compositions | | | |
| --- | --- | --- | --- | --- |
| | A | B | C | D |
| NR | 100.0 | 100.0 | 100.0 | 100.0 |
| carbon black (HAF) | 60.0 | 60.0 | 60.0 | 60.0 |
| zinc oxide | 10.0 | 10.0 | 10.0 | 10.0 |
| antioxidant (3C)* | 1.0 | 1.0 | 1.0 | 1.0 |
| process oil | 2.0 | 2.0 | 2.0 | 2.0 |
| vulcanization accelerator | 0.5 | 0.5 | 0.5 | 0.5 |
| cobalt naphtherate (Co content: 10%) | 2.0 | — | 2.0 | 2.0 |
| insoluble sulfur (80%) | 8.0 | 4.0 | 8.0 | 4.0 |
| resorcinol condensate** | — | 2.0 | 2.0 | 2.0 |
| HMMM | — | 3.5 | 3.5 | 3.5 |

*Nocrac 3C, N-phenyl-N'-(1,3-dimethylbutyl-p-phenylenediamine, Ohuchi Shinko Kagaku Kogyo K. K.
**B-18s, Koppers Company, Inc.

TABLE 2

| Tires | Standard Example 1 | Comparative Examples | | Inventive Example 1 | Standard Example 2 | Comparative Examples | |
| --- | --- | --- | --- | --- | --- | --- | --- |
| | | 1 | 2 | | | 3 | 4 |
| rubber-coated aramid cord | A | B | C | D | B | C | D |
| rubber-coated steel cord | A | B | C | D | A | A | A |
| tire as produced | 100 | 88 | 106 | 107 | 107 | 102 | 107 |
| heat-aged tire | 91 | 95 | 89 | 101 | 100 | 90 | 96 |
| moistened tire | 83 | 65 | 90 | 95 | 80 | 88 | 92 |

TABLE 3

| Physical Properties | Comparative Example 5 | Inventive Example 2 |
| --- | --- | --- |
| water resistance | | |
| before dipping | 13.0 kg (4.5) | 15.0 kg (5.0) |
| 1-day dipping | 8.5 kg (1.0) | 12.5 kg (2.5) |
| 3-day dipping | 8.5 kg (1.0) | 12.0 kg (2.5) |
| heat resistance | | |
| before heating | 14.5 kg (3.5) | 15.5 kg (4.5) |
| after heating | 9.0 kg (2.0) | 16.5 kg (3.0) | parentheses: ratios of rubber covering
5.0: release surface entirely covered with rubber
1.0: sample cord fully exposed

What is claimed is:

1. A pneumatic radial tire comprising:
   (a) a tire body; and
   (b) at least an upper belt ply and a lower belt ply built in contiguous relation in said tire body, one of said upper and lower plies being formed of an aromatic polyamide fiber cord, and the other being formed of a steel wire cord, each of said aromatic polyamide fiber and steel cords having a rubber composition coated on both sides thereof, said composition being comprised of:
   (b 1) 100 parts by weight of a rubber;
   (2) 2–4.5 parts by weight of sulfur;
   (3) 0.5–3 parts by weight of resorcinol, a precondensate thereof or a combination thereof;
   (4) 1–5 parts by weight of hexamethoxymethylmelamine; and
   (5) 0.05–0.5 part by weight of a cobalt compound derived from an organic acid.

2. The tire as claimed in claim 1 wherein said upper belt ply is formed of said aromatic polyamide fiber cord, and said lower belt ply is formed of said steel cord.

3. The tire as claimed in claim 1 wherein said rubber is selected from the group consisting of natural rubber, isoprene rubber, butyl rubber, acrylonitrile-butadiene copolymer rubber, styrene-butadiene copolymer rubber, butadiene rubber and combinations thereof.

4. The tire as claimed in claim 1 wherein said cobalt compound is selected from the group consisting of cobalt naphthenate, cobalt octylate and complexes of boron and cobalt compounds resulting from organic acids.

* * * * *